Oct. 13, 1936.  R. C. BLAYLOCK  2,056,999
CONTROL MECHANISM
Filed May 22, 1935  2 Sheets-Sheet 1

INVENTOR.
RAYMOND C. BLAYLOCK.
BY
ATTORNEYS.

Patented Oct. 13, 1936

2,056,999

UNITED STATES PATENT OFFICE 2,056,999

CONTROL MECHANISM

Raymond C. Blaylock, Kenmore, N. Y., assignor to Curtiss Aeroplane & Motor Company, Inc., a corporation of New York Application May 22, 1935, Serial No. 22,730

6 Claims. (Cl. 244—29)

This invention relates to aircraft control systems, and is particularly concerned with improved means for operating auxiliary control surfaces.

In recent types of aircraft, auxiliary control surfaces are used which comprise tabs or flaps hinged to a movable control surface which in turn is hinged to the aircraft. The hinge lines of the tab and control surface are spaced from one another so that the tab, when turned on its hinge, exerts a controlling effect upon the control surface which in turn exerts a control effect upon the aircraft. The preferred arrangement for actuating the tab comprises an operating member in the pilot's compartment by which the position of the tab with respect to the control surface may be pre-set. Thereafter, the control surface may be moved at will by means of the primary control stick or wheel. The tab is used for trimming the aircraft, and once it has been set for a given load or flight condition substantially no further adjustment is needed. It therefore becomes desirable to effect an irreversible control for the tab by which the action of air flow thereover cannot produce fluttering of the tab, which fluttering would be reflected into the main control surface and into the aircraft in the form of vibration and abnormal stresses.

An object of this invention, then, is to provide an irreversible control mechanism for an auxiliary control surface.

A further object is to provide a control mechanism which is wholly contained within the covering confines of the various elements with which it is associated, by which additional parasitic drag is minimized.

Still another object is to provide a control connection adjacent a control surface pivot by which movement of the control surface has relatively little effect upon movement of the auxiliary control surface from its pre-set position with respect to the main control surface.

A further object is to provide an articulating control organization for an auxiliary control surface, the articulation taking place on the hinge line of the main control surface with which the auxiliary control surface is associated.

Further objects will become apparent from a reading of the specification and claims, and from a consideration of the accompanying drawings, in which similar numbers indicate similar parts, and in which:

Figure 3:
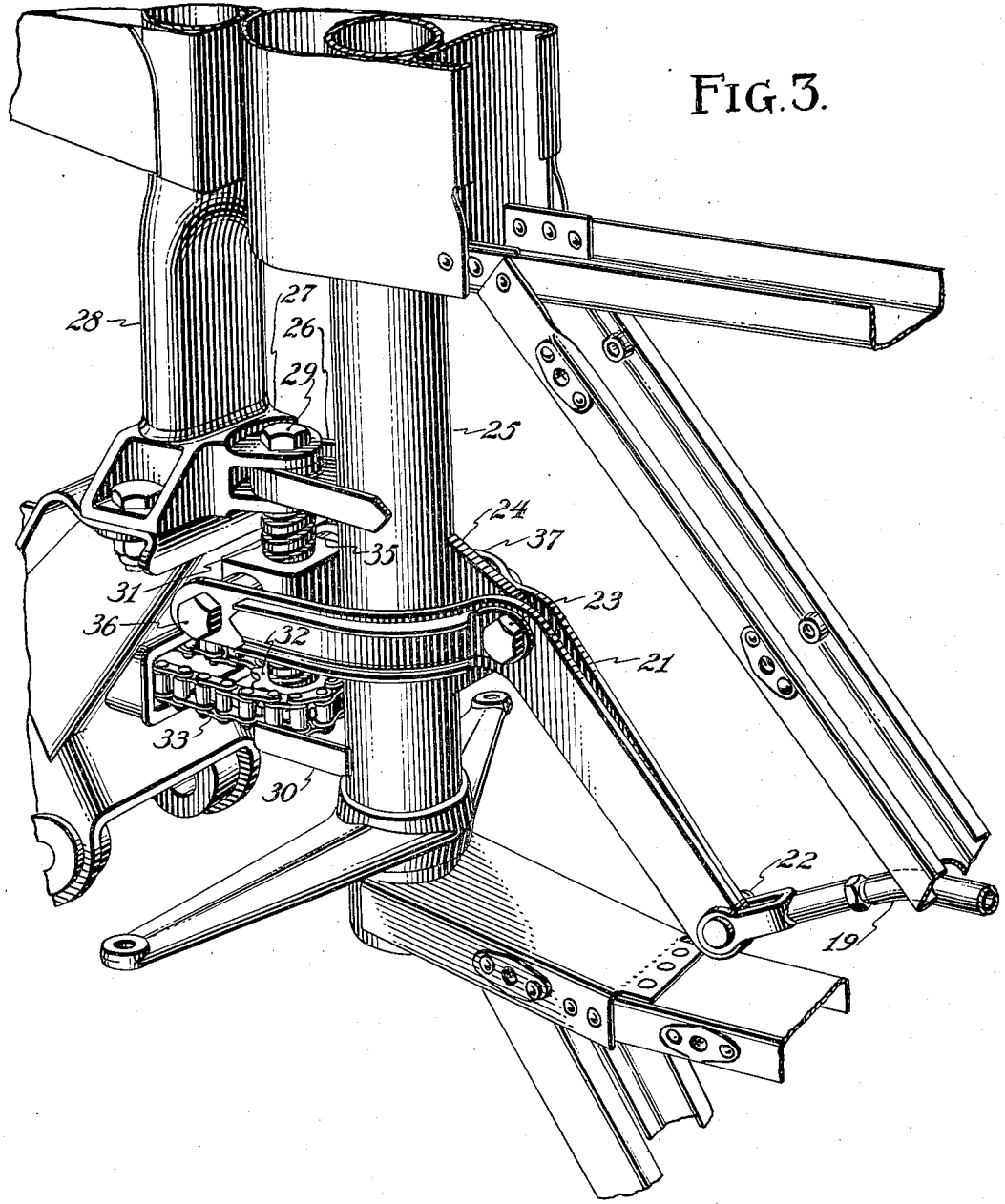
Fig. 3 is an enlarged perspective view in detail of the main control surface hinge structure and control mechanism for the auxiliary control surface.

In the figures, an aircraft fuselage 10 is provided with a horizontal stabilizer 11 and elevating surfaces 12 of conventional form. From the top of the rearward fuselage portion, a fin 13 extends, and a main rudder 14 is hinged along the line A—A to the trailing edge of the fin and the trailing portion of the top of the fuselage. A cut-out 15 in the trailing edge of the rudder 14 provides space for a tab 16 which is hinged to the rudder, as at 17. The tab is provided with a portion 18 to which a control connection 19 is pivoted, said connection extending through an opening 20 in the rudder covering. The forward end of the connection 19 is pivoted to the rearward end of a bell crank 21 as at 22, the bell crank being hinged at 23 to a fitting 24 rigidly attached to the torque tube 25 forming the backbone of the rudder structure. Referring to Fig. 3, the tube 25 is provided with forwardly extending hinge fittings 26 which engage in bifurcated fittings 27 carried by the frame 28 constituting the trailing structural member of the fin 13 and fuselage. A bolt 29 forms the hinge pin between the fittings 26 and 27 by which the rudder may swing with respect to the fuselage. A similar hinge arrangement may be provided in the conventional manner at the top of the fin trailing edge and at points intermediate thereof.

Figure 1:
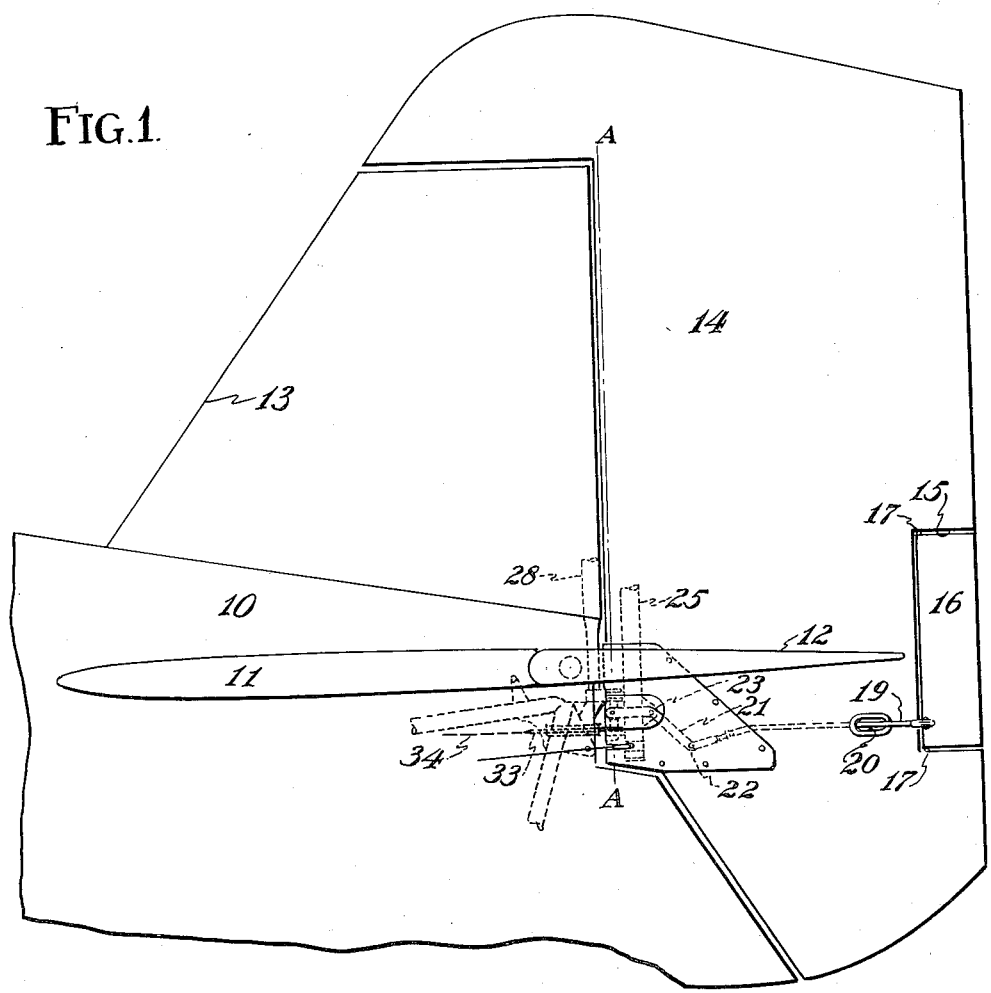
Fig. 1 is a side elevation of a portion of an aircraft empennage embodying an auxiliary tab and the control mechanism of this invention.
Figure 2:
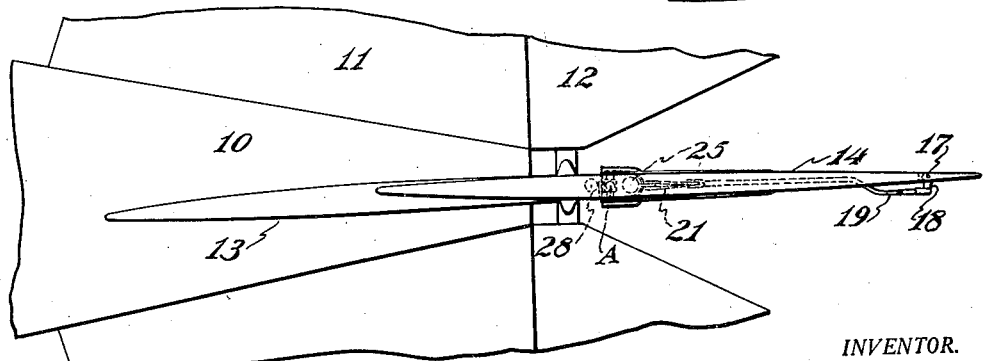
Fig. 2 is a plan of the empennage.

The bolt 29 is extended downwardly and the lower end thereof is piloted in a fitting 30 carried by the tube 25 and on said bolt, intermediate the fittings 26 and 30, a hollow screwshaft 31 is borne. The screwshaft is provided at its lower end with a sprocket 32 over which a chain 33 runs to be connected to control cables such as 34 shown in Fig. 1, leading to the pilot's cockpit. A nut 35 is threaded on the screw 31, the nut having trunnions 36 engaged by the bifurcated ends 37 of the bell crank 21. It will thus be seen that by turning the sprocket 32 on the screw 31 by means of the chain 33, the nut 35 is translated upwardly or downwardly along the screw, thus turning the bell crank 21 about its pivot 23. By virtue of the angled relationship of the bell crank ends, the rearward end moves in an arc, the tangent of which is angularly divergent from the path of movement of the nut 35. Thus, movement of the nut up or down effects forward or rearward movement of the pivot 22 and hence of the connection 19, thereby turning the tab 16 to right or left. The screw 31 will be of low pitch by which fine adjustment of the tab 16 may be obtained and by which irreversible action of the tab is produced. Since the screw 31 is concentric with the hinge axis of the rudder 14, the rudder may turn freely about its hinge without interfering with the tab setting, the tab, once set, remaining in substantially fixed relationship to the rudder regardless of rudder movement.

It will be appreciated from the structure above described, that a positive irreversible control is provided for the tab which permits the rudder to articulate freely about its hinge. In the prior art, tab control means are shown in which cables extend from the tab, adjacent the rudder hinge axis, to the pilot's cockpit. In such a construction articulation of the rudder without changing the position of adjustment of the tab may be attained, but the cable control permits of reversible action of the tab by which flutter may accrue. Such a difficulty is entirely avoided in the construction shown and described herein.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft control system including a primary control surface hinged to the aircraft and an auxiliary control surface hinged to the primary surface, control means for said auxiliary surface comprising a screw coaxial with the primary surface hinge, means for turning said screw, a nut translatable along said screw upon turning thereof, a bell crank pivoted to said primary surface and trunnioned at one end to said nut, and an operating connection from the other end of said bell crank to said auxiliary control surface.

2. In an aircraft control system including a primary control surface hinged to the aircraft and an auxiliary control surface hinged to the primary surface, control means for said auxiliary surface, the hinge axis of said auxiliary surface being substantially parallel to the primary surface hinge axis, comprising a guide coaxial with said primary surface hinge, means translatable along said guide, a bell crank pivoted to said control surface and trunnioned at one end to said translatable means, a horn on said auxiliary control surface, and a connection from said horn to the other end of said bell crank.

3. In an aircraft control system including a primary control surface hinged to the aircraft and an auxiliary control surface hinged to the primary surface, control means for said auxiliary surface comprising a low pitch irreversible screw coaxial with said primary surface hinge, means to turn said screw, a nut translatable along said screw upon turning thereof, and an operating connection from said nut to said auxiliary control surface.

4. In aircraft, a rudder hinged thereto, a tab hinged to said rudder for movement with and with respect thereto, a turntable screw coaxial with the rudder hinge and restrained from axial movement, a nut translatable thereon in response to turning thereof, and an operating connection from said nut to said tab.

5. In aircraft, a rudder hinged thereto, a horned tab hinged to said rudder for movement with and with respect thereto, a device translatable along the rudder hinge axis, a bell crank pivoted to said rudder, one end of said bell crank being movable substantially along the rudder hinge and being trunnioned to said device, the other end of said bell crank being movable along a path angled relative to said rudder hinge, and a push-pull rod operatively connecting said last named bell crank end with the horn of said tab.

6. In aircraft having a rudder hinged thereto and an auxiliary airfoil hinged to said rudder, a guideway coaxial with the rudder hinge axis, a block slidable along said guideway, means for sliding said block, a bellcrank pivoted to said rudder on an axis normal to said rudder axis, trunnion mean establishing a connection between one end of said bellcrank and said block, said bellcrank lying wholly within the confines of said rudder, a horn on said airfoil, and a control connection between said horn and the other end of said bellcrank.

RAYMOND C. BLAYLOCK.